April 21, 1970     C. L. ZUCK, JR     3,508,097

LEAD RETAINING SLIP RING ASSEMBLY

Filed Dec. 30, 1966     2 Sheets-Sheet 1

INVENTOR.
CHARLES L. ZUCK, JR.
BY
ATTORNEYS

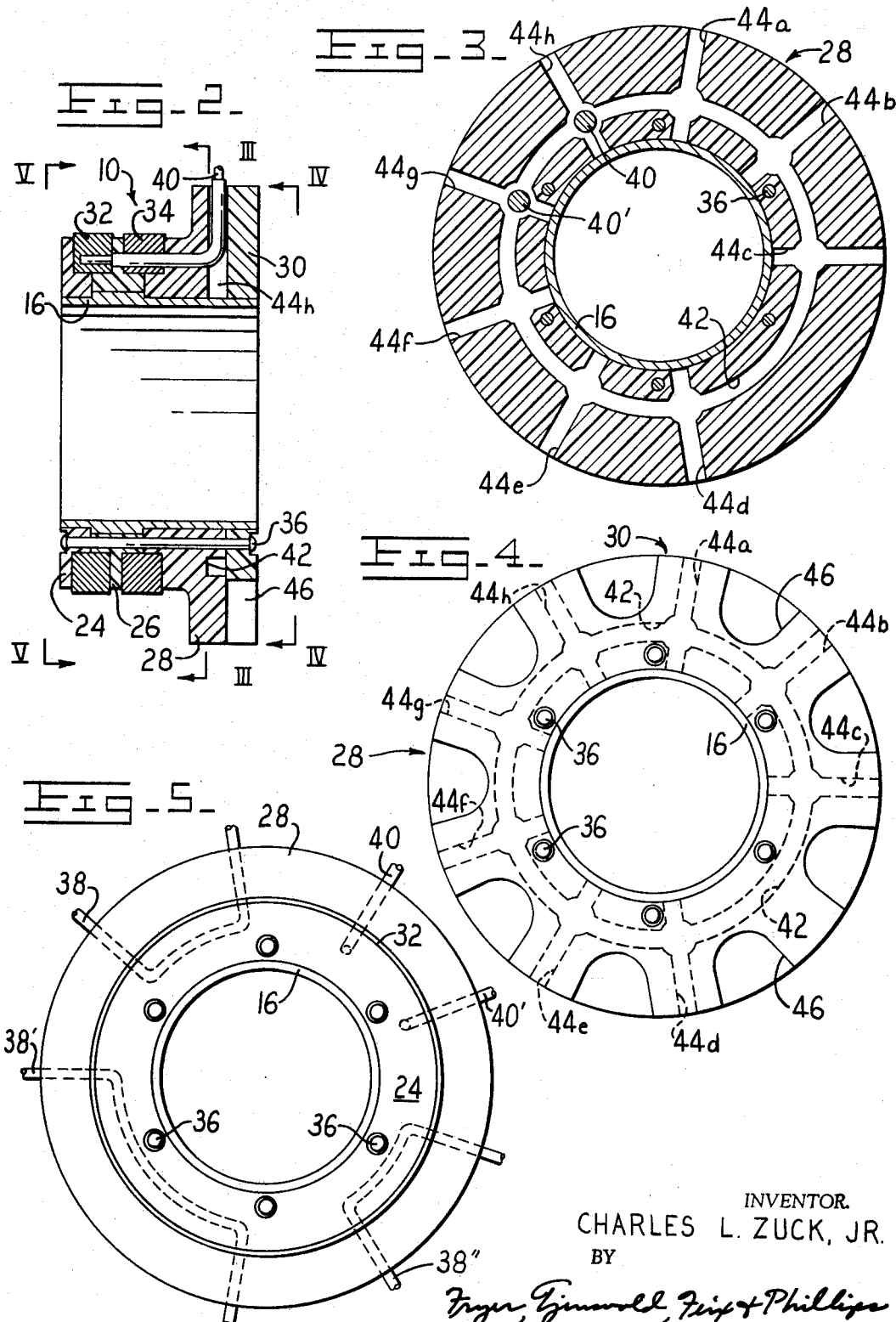

United States Patent Office 3,508,097
Patented Apr. 21, 1970

3,508,097
LEAD RETAINING SLIP RING ASSEMBLY
Charles L. Zuck, Jr., Washington, Ill., assignor to Caterpillar Tractor Co., Peoria, Ill., a corporation of California
Filed Dec. 30, 1966, Ser. No. 606,256
Int. Cl. H01r 39/08
U.S. Cl. 310—232                                4 Claims

ABSTRACT OF THE DISCLOSURE

A slip ring apparatus supplies current to the rotor assembly field windings of an alternator device, utilizing preformed slip ring segments to retain and thus confine the interconnecting and terminal leads of the field windings.

BACKGROUND OF THE INVENTION

In conventional alternators with salient pole rotor assembly constructions, the intermediate field connections between adjacent poles are made by bridging the space between poles. In a four pole machine these intermediate connections have to extend a considerable distance, and thus in fabrication must subsequently be clamped and/or "served" to protect the leads against failure due to centrifugal forces which are exerted on the leads during operation of the alternator. Conventional prior art rotor design thus includes a slip ring assembly in which for example, two rigid connections to the slip rings thereof are brought out the rear of the ring assembly to connect to the field winding terminal leads. All other connections between adjacent field windings are made by exteriorly bridging the wire or strap conductors or leads between poles along the outer periphery of the rotor. As may be seen such a fabricating procedure is both time consuming and costly when large numbers of such devices are to be constructed.

SUMMARY OF THE INVENTION

The present invention utilizes a preformed plurality of generally annular, insulating segments formed of a rigid insulating material, which segments are concentrically assembled along with a suitable number of slip rings, on a supporting sleeve to define a complete rigid slip ring assembly. The segments are provided with preformed grooves and holes, within which are integrally disposed the connecting leads which are subsequently used to interconnect the field windings.

Thus, the invention provides an extremely simple, rigid and neat construction which inherently precludes the need for circumferentially extending leads between adjacent field windings thereby circumventing any effects that centrifugal forces might produce. The invention construction provides for routing the individual field coil leads within the slip ring construction itself, close to the axis of the slip ring assembly. Thus any weight associated with such connecting leads is located at or near the center of the rotating mass of the assembly, to additionally improve the rotor balance characteristic, while simultaneously eliminating the need for costly and time consuming binding, and providing a slip ring configuration which inherently does not suffer from centrifugal forces at the periphery of the rotor. The radially extending coil leads of the invention configuration are readily and economically secured by only a slight amount of serving disposed about the insulating material at the rear of the slip ring assembly.

Accordingly, the invention provides an improved slip ring assembly formed of readily assembled, preshaped, insulating segments, adapted to receive and integrally retain therewithin the intermediate field leads for connecting together field coils of adjacent poles of a rotor assembly.

BRIEF DESCRIPTION OF THE DRAWINGS

FIG. 2 is a cross section view of the slip ring assembly of the invention showing in detail the various elements thereof;
and
FIGS. 3, 4 and 5 are transverse views taken along section lines III—III, IV—IV and V—V respectively of FIG. 2.

DESCRIPTION OF THE PREFERRED EMBODIMENT

Figure 1:
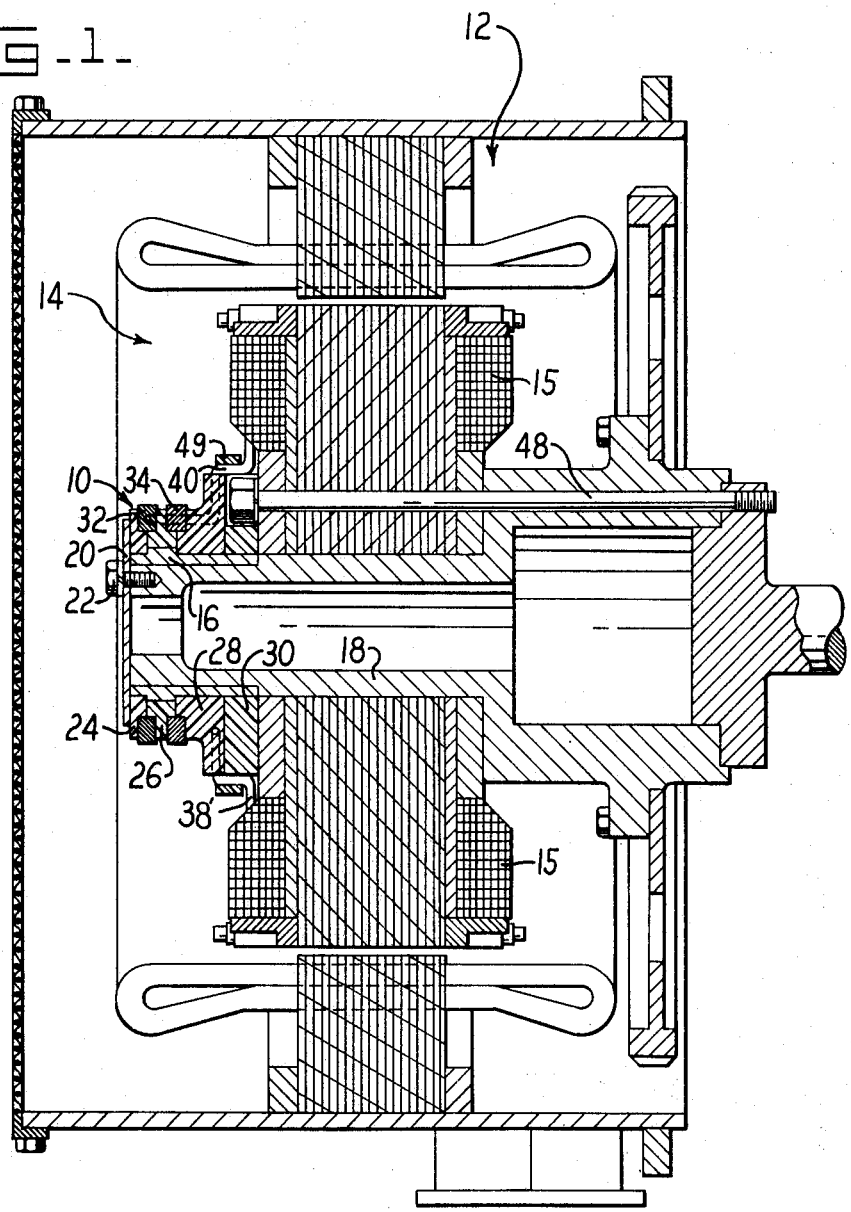
FIG. 1 is a cross section view of an alternator device showing the slip ring assembly of the invention as assembled to the alternator.

Referring to FIG. 1 there is shown a slip ring assembly 10 assembled in operational relationship to an alternator device 12. The assembly 10 is integrally connected to the rotor assembly 14 and thus situated adjacent the ends of the field coils 15 of the alternator 12, by means of a stepped sleeve 16 formed preferably of stainless steel and which is concentrically fitted on a rotor shaft 18 of the alternator 12, and which is secured thereto by means of a key (not shown) or simply by pressing the sleeve 16 on the shaft 18. The sleeve 16 and thus the slip ring assembly 10 is prevented from moving in an axial direction by a circular retaining plate 20, which is secured to the end of the shaft 18 as by means of a plurality of bolts or cap screws 22.

Referring to FIG. 2 in conjunction with FIG. 1, there is shown in greater detail the slip ring assembly 10 which is supported concentrically on the stepped sleeve 16. As can be seen, all the elements of the assembly 10 are positioned on the stepped sleeve 16 in coaxial sequence, as further shown and described hereinafter. Accordingly, four generally annular, insulating segments 24, 26, 28 and 30, formed for example, of a rigid insulating material such as synthane, are assembled on the sleeve 16 along with slip rings 32 and 34, and the entire assembled unit is secured and retained together as an integral assembly by means of a plurality of spaced rivets 36. As depicted in the FIGS. 1 and 5, a field intermediate lead 38′ and a field terminal lead 40 are disposed in preformed grooves and holes in the insulating segments 28 and 26 as described further infra.

Accordingly, referring to FIGS. 2, 4 and 5 in conjunction with FIG. 2, insulating segment 28 is provided with a single circular groove 42 formed in the circular surface thereof which faces the segment 30. The circular groove 42 is intersected by a spaced series of radially extending grooves herein depicted as a 44a–h which are thus disposed to accommodate the field intermediate and field terminal leads 38 and 40, respectively. More particularly, the radially extending groove 44h receives one of the field circuit terminal leads 40 along a portion thereof which extends radially along the groove 44h (FIGS. 2 and 5) and then axially along the slip ring assembly through holes drilled in the insulating segments 28 and 26 and the slip ring 34, and then is electrically connected to the slip ring 32 for example, via a hole therein. The other field terminal lead (not shown) is similarly routed through the segment 28 only, and is electrically connected to the slip ring 34. The lead 40 as well as all other wiring which is retained in the assembly and particularly which passes through the slip rings is electrically insulated as for example by means of silicone glass sleeving.

As particularly shown in FIGS. 3–5, the grooves 42 and 44a–h provide preformed channels through the insulating material of segment 28 for retaining the terminal leads 40, 40′ as well as the field intermediate leads which extend between adjacent field coils, and which are herein depicted by numerals 38, 38′ and 38″. As shown, two axial holes are drilled through the segment 28 at the intersection of the circular groove 42 and the radial grooves 44g and h to accommodate the field terminal leads 40 and 40' (FIGS. 3 and 5). As previously mentioned lead 40 extends axially through corresponding holes in slip ring 34 and segment 26 to connect to slip ring 32, while lead 40' extends through segment 28 to connect to slip ring 34.

FIG. 5 is an elevational view of the front of the assembly 10 taken along line V—V of FIG. 2. The field terminal leads 40 and 40' and intermediate field leads 38, 38' and 38", which interconnect the field coils of adjacent poles are shown in phantom line, routed through the insulating material of the assembly 10 as described above. By way of example only, field intermediate lead 38 extends through grooves 44a, 42 and 44b to protrude radially from the segment 28. Lead 38' extends through grooves 44c along a portion of groove 42 and through groove 44d to protrude radially from segment 28. Lead 38" protrudes from the segment 28 at either end thereof and is disposed in grooves 44e, 42 and 44f. The leads 38, 38' and 38" as well as leads 40 and 40' are held in place after assembly of the slip ring assembly by the segment 30, which bears against the grooved face of the segment 28.

FIG. 4 is an elevational end view of the assembly 10, taken along line IV—IV of FIG. 2. As shown segment 30 is recessed, as indicated at 46, at spaced intervals about its outer periphery to define a splined configuration to allow the close coupling of the slip ring assembly 10 and the alternator rotor assembly 14. Thus the plurality of recesses 46 are provided to accommodate the heads of a like plurality of bolts 48 (FIG. 1) which secure the laminations of the rotor assembly 14 together. The grooves 42 and 44a–h are again shown in phantom line in the FIG. 4. Note the heads of rivets 36 which are countersunk in the segment 30.

In construction, the slip ring assembly 10 is assembled apart from the rotor shaft 18 of the alternator 12, by fitting the various elements thereof on the sleeve 16 in order, starting with the insulating segment 24. Slip ring 32 is then put in place in the step of segment 24 and the end of the field terminal lead 40 is securely attached to the slip ring 32. A step in insulating segment 26 is then fitted against the slip ring 32 and slip ring 34 in turn is fitted onto a step in the segment 26 on the other side thereof. Note the end of the lead 40 is passed through holes in the segment 26 and the slip ring 34 which are axially in register with the spot where the lead 40 connects to the slip ring 32. The field terminal lead 40' is then connected to the slip ring 34 and the free ends of both leads 40 and 40' are passed through holes in the insulating segment 28 as it is fitted upon the stepped sleeve 16. The leads 40 and 40' are then bent radially outwardly to conform them with the respective radial grooves 44h and 44g, and the leads protrude radially from the segment 28. Next, insulated field intermediate leads 38, 38' and 38" of suitable current carrying capacity are shaped and fitted within their respective grooves as shown supra, to protrude radially a short distance beyond the periphery of the segment 28. Then insulating segment 30 is fitted over the end of the sleeve 16 and against the grooved face of the segment 28 and the plurality of long rivets 36 are fixed in place to thus confine the leads 38, 38', 38", 40 and 40' securely between segments 28 and 30 within the grooves. As shown in FIG. 1, the protruding ends of the leads may be flattened against the periphery of the segments 28 and 30 and may be served in place by a layer of glass banding or other insulating binding material, as herein indicated by numeral 49.

When the slip ring assembly 10 is constructed it is assembled to the rotor shaft 18 as previously described. The protruding ends of all leads are accordingly properly situated relative to the field coils 15 to allow connecting the ends of the field coil leads to the respective protruding ends of the leads 38, 38', 38", 40 and 40' as is portrayed in part in FIG. 1.

Although the present invention has been described herein with respect to a single embodiment it is to be understood that various modifications may be made thereto within the spirit of the invention. For example, although the slip ring assembly 10 is shown assembled to form a unit by means of rivets 36 only, the assembly also may be assembled together and potted with one of the known epoxy resin potting compounds to provide greater lead rigidity and increased moisture resistance. Additionally, the leads 38, 38', 38", 40 and 40' may be formed of heavy, rectangular lengths of copper disposed within the grooves 42 and 44a-h, which may then further be adapted at the ends thereof to terminate in terminal fittings (not shown) which are set within the periphery of the segment 28 to protrude slightly therefrom. Thus the entire assembly 10 could be potted after being assembled as a unit and the field coil leads extending from the field coils 15 could be provided with matching lugs (not shown) to allow ready connection to the leads in the assembly 10. Thus it is not intended to limit the scope of the invention except as defined by the following claims.

What is claimed is:

1. A slip ring assembly for providing connections to and between field coils of adjacent poles of an alternator rotor wherein the assembly is mounted to a shaft of the rotor, the combination comprising:

preformed insulator means adapted to be integrally secured to said rotor by a support member, said insulator means having a series of internal grooves and external annular channels, said preformed insulator means comprising a plurality of generally annular segments of electrically insulating material secured by said supporting member, said segments being selectively preformed to define the internal grooves and the external annular channels upon assembly, said internal grooves further comprising a circular groove concentrically formed in the insulator means, and a spaced series of radial grooves in communication with said circular groove and extending radially therefrom to the outer periphery of the insulator means;

slip ring means disposed within said annular channels; and a pair of field terminal leads and a plurality of intermediate field connection leads disposed within said internal grooves and integrally retained by said insulator means, said field terminal leads extending from said assembly to connect said slip ring means to said field coils, said intermediate field leads providing intermediate field connections between the field coils independent of said slip ring means.

2. The assembly of claim 1 wherein said supporting member is a hollow sleeve; and said annular segments are concentrically secured to said hollow sleeve and selected ones of the segments are adapted to define said exterior annular channels for receiving in alternate relation said slip ring means, said circular and radial grooves are formed in the radially extending surface of one of the segments.

3. The assembly of claim 2 further comprising a first and second insulating segment adjacently disposed on said sleeve; a first slip ring partially embedded within a portion of the periphery of the segments; a third insulating segment disposed on the sleeve and against the second segment; a second slip ring partially embedded within a portion of the periphery of the second and third segments; said third segment having said circular and radial grooves formed in the face thereof opposite that near the second slip ring; said second and third segments and said second slip ring having axially extending holes therethrough; said pair of field terminal leads extending along respective radial grooves in the third segment and through the axial holes to electrically connect to respective slip rings; said field intermediate leads each extending along a pair of respective radial grooves and interconnecting portions of the circular groove extending therebetween within the third segment; wherein said leads extend from the spaced radial grooves in the third segment to connect to respective ends of said field coils.

4. The assembly of claim 3 further including a fourth segment concentrically secured on said sleeve and against the grooved surface of the third segment to confine said leads therebetween.

References Cited

UNITED STATES PATENTS

| | | | |
|---|---|---|---|
| 3,042,998 | 7/1962 | Sweett et al. | 310—232 |
| 2,371,996 | 3/1945 | Holmgren | 310—232 |
| 2,473,526 | 6/1949 | Hood et al. | 310—232 |
| 2,950,403 | 8/1960 | Kilner et al. | 310—232 |
| 3,023,331 | 2/1962 | Hoffman et al. | 310—232 |
| 2,696,570 | 12/1954 | Pandapas | 310—232 |
| 2,961,385 | 11/1960 | McGall | 310—232 |
| 1,108,940 | 9/1914 | Starker | 310—232 |

MILTON O. HIRSHFIELD, Primary Examiner

G. P. TOLIN, Assistant Examiner